UNITED STATES PATENT OFFICE.

DAN READ AND JOHN F. GALLEY, OF NEW YORK, N. Y.

IMPROVED COMPOSITION FOR COATING IRON.

Specification forming part of Letters Patent No. 53,336, dated March 20, 1866; antedated March 6, 1866.

*To all whom it may concern:*

Be it known that we, DAN READ and JOHN F. GALLEY, of the city and State of New York, have invented a new and useful Improvement in the Manufacture of Compositions for Coating Surfaces of Iron and other Metals and of Wood and other Materials; and we do hereby declare that the following is a full, clear, and exact description thereof.

Our invention consists in first forming and preparing a compound composed of gutta-percha, asphaltum, and shellac, or their respective chemical equivalents; second, in preparing another compound from vulcanizable gums, and especially gutta-percha compounded and prepared for vulcanization; and, third, in reducing both compounds to a fluid or semi-fluid state and amalgamating them into one.

The object of the invention is to provide a coating for such surfaces which may be applied in the same manner as ordinary paint, and which is not only of a more durable nature, but will more effectually protect the surfaces to which it is applied from both the drying and moistening effects of the atmosphere and elements, entirely securing the hulls and sides of iron vessels from the corrosive effects of salt-water and providing a non-conducting cover to the outer surfaces of boilers and other metal surfaces subjected to heat from the opposite side to that to which the coating is applied.

To enable others skilled in the art to make and use said manufacture, we will describe the mode of preparing and using it.

In view of properties desired for the more general use and application of the manufacture or coating, we have found in practice that the relative proportions of gutta-percha, asphaltum, and shellac to form the first compound hereinafter described are as follows, viz: one pound of gutta-percha, three pounds of asphaltum, and one pound of shellac. These are to be mixed and prepared in the following manner: Place the asphaltum in an iron or suitable metal vessel over a moderate fire, stirring it as it melts. When thoroughly melted, introduce the gutta-percha, which should be of the pure gum divested of all foreign substances, and previously cut as finely as practicable, putting in slowly and stirring vigorously until the asphaltum and gutta-percha are fully amalgamated. Then introduce the shellac, still continuing the stirring, as before. Care must be taken not to raise the temperature higher than is absolutely necessary to keep the compound in a liquid state until this amalgamation is accomplished; and the compound should be removed as soon as all the materials are perfectly amalgamated. This may be readily ascertained by testing—taking out from time to time small quantities, allowing the sample to cool, then breaking it. When the sample exhibits uniformity of density and color at the point of fracture the process is completed; and the compound when cold will be in a solid state, in which it may be kept until wanted for use.

When wanted for use the compound thus prepared is dissolved in benzole, in proportion of two pounds of the compound to one gallon of benzole. If the compound has been carefully and properly prepared it will readily dissolve; but should it have been subjected to a greater heat, or remained in the vessel too long, and in consequence have become harder and less solvent; the composition and benzole should be put in a proper vessel and subjected to a gentle heat, not exceeding, however, $150°$ Fahrenheit's scale; but this should be applied by steam or hot air, as, from the inflammable nature of the benzole, the application of fire directly to the vessel would be dangerous.

We form the other or second compound of gutta-percha, or analogous gums, mixed with sulphur and other ingredients, in a manner well known to persons skilled in preparing such gums for vulcanization, and in the same manner such gums are prepared for vulcanization. This compound we also dissolve in benzole in the same proportions as the other—that is to say, two pounds of the compound to one gallon of benzole, and subject it to the same degree of heat and by the same means as provided for the first-named compound.

When both compounds are thoroughly dissolved mix them together, and the whole is ready for use, and may be readily applied with a brush, avoiding as much as possible going over the same surface more than once at the same operation.

Additional coats may be applied, if desired, but this should not be done until the first is set and dried, which, with favorable weather and full exposure to a dry atmosphere, will be in about twenty-four hours.

There are a number of modifications and changes which may be made in these compounds, according to the various uses to which the coating may be applied. The residuum of coal-tar—that is what remains after the volatile portions are removed by distillation or otherwise, may be substituted, in whole or in part, as desired, for the shellac. This will impart a luster resembling paint. And for coating boilers and other metal surfaces subjected to heat from the side opposite to that coated, a much larger proportion of the second compound, containing the gum prepared for vulcanization must be used, as it is intended to vulcanize this coating, which the action of the heat will accomplish. The proportions of each ingredient may be changed, and the chemical equivalents of each substituted.

We do not, therefore, wish to be understood as limiting our claim to the ingredients specifically named or the proportions set forth; but What we do claim, and desire to secure by Letters Patent, is—

A manufacture or composition for coating the surfaces of iron or other metal, and of wood and other materials, compounded of gutta-percha, asphaltum, and shellac, or the residuum of coal-tar, or the equivalent of either, combined with a compound of gutta-percha prepared for vulcanization, or its equivalent, in substantially the manner and for the purposes herein specified.

DAN READ.
JNO. F. GALLEY.

Witnesses:
PETER VAN ANTWERP,
THOS. D. JAMES.